United States Patent
Teijido

(10) Patent No.: US 7,035,015 B2
(45) Date of Patent: Apr. 25, 2006

(54) ILLUMINATION UNIT, PROJECTING ENGINE AND METHOD FOR GENERATING ILLUMINATION LIGHT

(75) Inventor: Juan Manuel Teijido, Kernen (DE)

(73) Assignee: SONY International (Europe) GmbH, Berlin (DE)

( * ) Notice: Subject to any disclaimer, the term of this patent is extended or adjusted under 35 U.S.C. 154(b) by 0 days.

(21) Appl. No.: 10/889,572

(22) Filed: Jul. 12, 2004

(65) Prior Publication Data
US 2005/0099698 A1    May 12, 2005

(30) Foreign Application Priority Data
Jul. 14, 2003    (EP) .................................. 03015976

(51) Int. Cl.
*G02B 3/00* (2006.01)
*G03B 21/00* (2006.01)
*F21V 9/14* (2006.01)

(52) U.S. Cl. .................. 359/649; 359/618; 362/19; 353/31

(58) Field of Classification Search ................ 359/649, 359/618, 634; 362/19; 353/20, 31, 34, 37; 348/744
See application file for complete search history.

(56) References Cited

U.S. PATENT DOCUMENTS

| 5,815,221 | A | * | 9/1998 | Kojima et al. | ............... | 348/751 |
|---|---|---|---|---|---|---|
| 6,390,626 | B1 | * | 5/2002 | Knox | ............... | 353/20 |
| 6,505,939 | B1 | | 1/2003 | Bierhuizen et al. | ........... | 353/94 |
| 6,871,982 | B1 | * | 3/2005 | Holman et al. | ............. | 362/331 |
| 2001/0048493 | A1 | | 12/2001 | Swanson et al. | ............. | 349/62 |
| 2001/0048560 | A1 | | 12/2001 | Sugano | ....................... | 359/618 |
| 2003/0030913 | A1 | | 2/2003 | Park et al. | ................... | 359/634 |

FOREIGN PATENT DOCUMENTS

| JP | 2001 183763 | 7/2001 |
|---|---|---|
| WO | WO 03 005733 | 1/2003 |

* cited by examiner

Primary Examiner—Scott J. Sugarman
Assistant Examiner—M. Hasan
(74) Attorney, Agent, or Firm—Oblon, Spivak, McClelland, Maier & Neustadt, P.C.

(57) ABSTRACT

It is proposed to provide in an illumination unit (10) a light combining section (15) being adapted for receiving and combining first and second primary illumination light (L11, L12) or a derivative thereof and a light collecting, integrating and redirecting section (20) being adapted for receiving, collecting, integrating and redirecting first and second primary illumination light (L11, L12) or a derivative thereof, wherein said light combining section (15) and said light collecting, integrating and redirecting section (20) are at least partly arranged in a spatially mingled manner with respect to each other. Thereby from said first and second primary illumination light (L11, L12) collected, integrated and redirected combined primary illumination light (CL1) can be obtained and emitted as secondary illumination light (L2) having controlled spectral properties and an essentially uniformized spatial intensity distribution.

17 Claims, 7 Drawing Sheets

ILLUMINATION UNIT, PROJECTING ENGINE AND METHOD FOR GENERATING ILLUMINATION LIGHT

The present invention relates to an illumination unit according to the preamble of claim 1, and in particular to a hybrid illuminator for an improved spectral balance light generation and projection. The present invention further relates to a projection engine and to a method for generating and providing illumination light.

Nowadays, in many electronic appliances display devices are necessary for displaying information to a user or an audience. Because of the large variety of different types of electronic appliances having such display device it became necessary to develop display device for which only a limited space and/or a limited power consumption are available. A further problem which is the so-called spectral-balance or color-balance of the illumination light which are involved in the display devices in question.

It is therefore an object of the present invention to provide an illumination unit, a projection engine and a method for generating illumination light in which spectral properties or color properties can be established in a particular easy, controllable and reliable manner.

The object is achieved by an illumination unit according claim 1. Additionally, the object is achieved by a projection engine according to the features of claim 16. The object is also achieved by a method for generating and providing illumination light according to the features of claim 17.

The inventive illumination unit, in particular for projection engines or the like, comprises at least a first light source device and a second light source device. Said first and second light source devices are adapted for generating and for emitting first and second primary illumination light, respectively. Said first and second primary illumination light can be generated by said first and said second light source devices, respectively, having at least in part essentially complementary or supplementary spectral and/or polarization components with respect to each other. Additionally at least one light combining area, section, portion, or device is provided which is adapted for receiving, combining and/or superposing said first and second primary illumination light or parts or derivates thereof.

In contrast, to prior art illumination units—which in fact directly use said primary illumination light and/or said combined primary illumination light as illumination light for outputting to further processing and for illuminating for instance a light valve device or the like—according to the invention a light collecting, integrating and redirecting area, section, portion, or unit is provided. Said light collecting, integrating and redirecting area, section, portion, or unit is adapted for receiving, collecting, integrating and redirecting said first and second primary illumination light or parts or derivates thereof.

According to the present invention said light combining area, section, portion or device and said light collecting, integrating and redirecting area, section, portion or unit or a parts thereof are formed and/or arranged in a spatially mingled, mixed up, integrated, and/or overlapping manner with respect to each other. Thereby said light combining area, section, portion or device and said light collecting, integrating and redirecting area, section, portion or unit are adapted for cooperating and for obtaining from said first and second primary illumination light and for emitting collected, integrated and redirected combined primary illumination light as secondary illumination light having controlled spectral properties and an essentially uniformized spatial intensity distribution.

It is therefore a basic idea of the present invention to collect, integrate and redirect the first and second primary illumination light by using a light collecting, integrating and redirecting unit. Thereby first and second primary illumination light is combined or superposed and made uniform in its energy and/or intensity distribution before being further processed.

An advantage is the space saving spatially mingled, mixed up, integrated, and/or overlapping arrangement of said light combining area, section, portion or device and said light collecting, integrating and redirecting area, section, portion or unit or a parts thereof.

In the following the notions light combining area, section, portion or device are interchangeably used. Further, the notions light collecting, integrating and redirecting area, section, portion or unit are interchangeably used.

According to a preferred embodiment of the inventive illumination unit said light collecting, integrating and redirecting unit comprises at least one integrator rod, solid rod, light pipe or the like as a light integrating device. This light integrating device is in particular made of an optical transparent material, for instance it is made of plastic, glass, or the like.

Additionally or alternatively said light collecting, integrating and redirecting unit comprises at least one hollow tube device as a light integrating device. Said hollow tube device comprises in particular reflecting or mirrored inner walls or sidewalls.

Further additionally or alternatively, said light collecting, integrating and redirecting unit comprises at least one fly-eye lens system as a light integrating device.

According to a further alternative of the present invention said light integrating device has a square-shaped, rectangular, hexagonal or equilateral triangular cross-section.

There are different realizations possible which may embody said first and second light source devices.

It is according to an advantageous embodiment of the present invention possible that said first light source device and/or said second light source device are or comprise a single or a plurality of discharge lamps, in particular high pressure discharge lamps.

Additionally or alternatively, said first light source device and/or said second light source device are or comprise a single or a plurality of solid state light source devices.

These solid state light source device is or comprises advantageously a single or a plurality of solid state light sources.

These solid state light sources may be embodied by different realizations.

First of all, said solid state light source may be or may comprise a single or a plurality of light emitting diodes. Additionally or alternatively, said solid state light source may be or may comprise a single or a plurality of laser diodes.

Further, said solid state light source may be or may comprise a single or a plurality of edge-emitting light emitting diodes.

Additionally or alternatively, said solid state light source may be or may comprise a single or a plurality of vertical cavity surface emitting laser devices.

Also a single or a plurality of resonant cavity light emitting diodes may be used as said solid state light source.

It is preferred that said inventive illumination unit comprises as a first light source device a discharge lamp and additionally as a second light source device a solid state light source device which compensates those spectral ranges of the discharge lamp which have a weak intensity or energy distribution.

According to a further embodiment of the present invention an illumination unit is provided, wherein said light combining area, section, portion or device comprises spectral selective reflection element, in particular a dichroic mirror or the like, or an arrangement of a plurality of spectral selective reflection elements.

According to a further embodiment of the present invention an illumination unit is provided, wherein said spectral selective reflection element in particular said dichroic mirror or the like, or said arrangement of said plurality of spectral selective reflection elements is arranged within said integrator rod, solid rod, hollow rod, light pipe or the like as said light integrating device and/or wherein said spectral selective reflection element, in particular said dichroic mirror or the like, or said arrangement of said plurality of spectral selective reflection elements is arranged within and/or surrounded by said fly-eye lens system.

It is a further aspect of the present invention to provide a projection engine in which an illumination unit according to the present invention is provided.

A further aspect of the present invention is to provide a method for generating and providing illumination light, in particular for a projection engine. The inventive method comprises the steps of generating and providing first and second primary illumination light having at least in part essentially complementary or supplementary spectral components with respect to each other, combining said first and second primary illumination lights or parts or derivates thereof, and collecting, integrating and redirecting said first and second primary illumination lights or parts or derivates thereof, wherein the processes of combining said first and second primary illumination lights or parts or derivates thereof and of collecting, integrating and redirecting said first and second primary illumination lights or parts or derivates thereof are performed in a spatially and/or temporally mingled, mixed up, integrated, and/or overlapping manner with respect to each other, thereby obtaining and outputting collected, integrated and redirected combined primary illumination light as secondary illumination light having controlled spectral properties and an essentially uniformized intensity distribution.

In the following, these and further aspects of the present invention will be more elucidated taking reference to the following remarks:

The present invention relates in particular to a hybrid illuminator for improved white balance projection.

Known projector devices suffer from the inadequate spectrum of traditionally used high pressure lamps. This results in poor spectral balance, in particular a poor white balance. The white balance can conventionally be improved by cutting part of the energy of one or two of the color channels, but this approach results in an unacceptable loss of brightness. An other conventional solution consists in combining an additional monochrome light source which compensates the deficiency of the high pressure lamps in a given color channel.

This invention proposes different optical designs for the combination e.g. of an array of solid state light sources (i.e. LEDs or laser diodes) into the projector light engine.

The fact that the spectrum of high pressure lamps per se is not perfectly adapted to the requirement of projector is well known. The result is no perfect white balance, which might be tolerable in presentation projectors, but is unacceptable for high quality cinema projectors.

The balancing of the red, green and blue channels can be optimized by carefully choosing the spectral response of the dichroic filters, but this approach is insufficient in order to achieve a perfect white balance.

An easy approach consists in cutting part of the energy of one or two color channels. In this case a prefect white balance is achieve, but at cost of brightness (typically 30%). This solution is not acceptable.

According to the invention practical implementations of this concept of using an additional light source in order to compensate the lack e.g. of red of high pressure lamps are suggested using the concept of balance of energy between different channels.

Also an optical design is proposed for coupling one or an array of emitters into a projector's light engine. The use of multiple emitters or arrays may be required in order to overcome the limited emission power of single LED and/or laser diodes.

A projection engine or projector generally consists in 4 primary parts, namely the light source, the light engine, the light valve or micro-display, and the projection lens. In order to achieve a bright and uniform image on screen, the challenge consists of collecting the light emitted by the source and of illuminating uniformly the light valve or surface $S_2$ within the limited angle of aperture $\phi_2$ of the projection optics.

Note that the light valve can either be transmissive or reflective. This does not affect the principle of color management which is the purpose of the invention.

In most cases, the light source is high pressure arc lamp. Xenon and metal halide lamps may also be used. The spectrum of the lamp is either spatially separated in three color paths red, green, blue and directed onto three separated micro-displays or it is time sequentially separated by a color wheel or an electronic color switch in which case a single panel is used. The color gamut is achieved by modulating and recombining spatially or temporally the three color components. The spatial recombination can be achieved e.g. with a color cube. The temporal recombination is achieved by using the limited frequency resolution of the detector, e.g. around 30 Hz of the human eye. A fast color modulation cannot be distinguished and the perception corresponds to the addition of the different color components.

Given the complete or total spectrum distribution of a UHP lamp—as shown in FIG. 6 below by trace T—in the red R, green G and blue channels B, only a given percentage of each color generates the desired white balance. The amount of energy in each channel is fixed by the complete or total spectrum distribution T of the lamp and the kind of process of subsequently dividing into the red R, green G and blue channels B achieved by the light engine. The relative proportion of energy in each channel does not generally correspond to the proportion necessary to achieve a good white balance.

The chromaticity coordinate corresponding to the spectrum of FIG. 7 is is represented by an "achieved chromaticity coordinate" point. It is observed a shift with respect to the desired white point chromaticity coordinate. The interior of the gamut triangle indicates the chromaticity coordinates of the color palette that the projector can display. Each corner of the triangle corresponds to the color coordinate of each color channel designed by the letters R, G, and B, for red, green, and blue.

The coordinate of the projector white point can be modified by modulating the energy present in the different channels. The exact energy balance correction will depend on the type of UHP lamp, and the spectral response of the light engine. These are the basic possibilities to achieve the desired white balance:

1. Attenuate the energy in the green and blue channels. This attenuation can be directly realized by the light valve. The problem arises that the ideal white point is achieved at the cost of a significant diminution of brightness (typically 30%).
2. Increase the energy in the blue and red channels. This requires the use of two supplementary light sources. Blue solid state light sources have limited brightness which makes this solution unrealistic, at least in the short term. As energy is added the brightness of the projector is increased.
3. Attenuate the energy of the green channel and increasing the energy of the red channel. This approach represents a good compromise as the resulting white point brightness is only slightly diminished (typically 10%).

According to the invention, at least one or a plurality of supplementary light sources are involved. Different recombination schemes are possible.

Case A): One color channel of the of the high pressure lamp is cut. And is substituted by a complementary lamp which has an independent light path in the light engine. This has the advantage that the illumination optics can be optimized taking into account the characteristics of the complementary source. Here, the complementary sources has to deliver a lot of energy, as the energy of the UHP lamp in the corresponding spectral range or at the respective wavelength is not used.

Case B): The light of the high pressure lamp and the complementary lamp are added before the light engine. A dichroic pass-band filter is used for the light combination. A complementary source having a narrow spectral emission is required. This has the advantage that an unmodified light engine architecture can be used. This is a preferred configuration.

Case C): The recombination may be done after the color separation. This has the advantage that two channels are unaffected; the design of the pass-band filter is easier. However, the collimation and homogenization optics has to be designed specifically for the recombination channel.

As already mentioned, the role of the light engine is to collect the light from the source or sources and to illuminated uniformly the light valve within the angle of acceptance of the projection lens. Two schemes are used for this purpose, i.e., the fly-eye lens configuration and the integration rod configuration. The color channel using a complementary light source has to comply with these existing architecture. The integration of the complementary light source into the light engine is the object of this invention.

Due to their spectrum emission characteristics, semiconductor light sources or laser diodes or LEDs are the preferred candidates to be used as complementary light sources. The collimation and homogenization of the source has to be done for the cases when the source replace one color channel and when the source is added to the UHP lamp. If the amount of energy to be added into a specific color channel (red and/or blue) is significant, one single emitter may not be enough to fulfill the task. Then a laser diode array or an array of LEDs will be used. Incidentally, the use of a laser diode array is also beneficial in order to destroy on screen speckle interference. The collimation and the homogenization optics for the array has also to be integrated into the light engine.

If the complementary source replaces one color channel the optics of this channel can be done independently of the rest of the optical engine. This case only applies for engines based on spatial color separation.

If the complementary source is added to one of the existing channels, the collection, collimation and combination optics needs to be integrated into the existing light engine.

For the fly-eye lens configuration, it is required that the energy distribution is distributed symmetrically versus the optical axis on the $1^{st}$ fly-eye lens. Due to the projector embodiment, this is impossible to achieve when combining two light sources. The proposed solution consists of using a dichroic pass-band filter between the two fly-eye lenses thus the light of the sources can be recombined.

FIG. 6 illustrates the spectrum resulting of the combination of the two sources.

In case of the integration rod configuration, the light needs to be coupled onto the limited cross-section of the rod. In case of a single emitter configuration, a dichroic pass-band filter can be used as for the fly-eye lens configuration. However, the coupling of a emitter array is problematic due to the limited cross-section of the pipe. The proposed solution consists in integrating a series of dichroic pass-band filters into the integration rod. Each emitter and corresponding filter have a wavelength which is slightly different.

One main advantageous difference of the invention over the prior art is that it allows to integrate the second light source into current projector architecture with minimal modification.

In the following the invention will be described in more detail taking reference to the accompanying figures.

Figure 6:
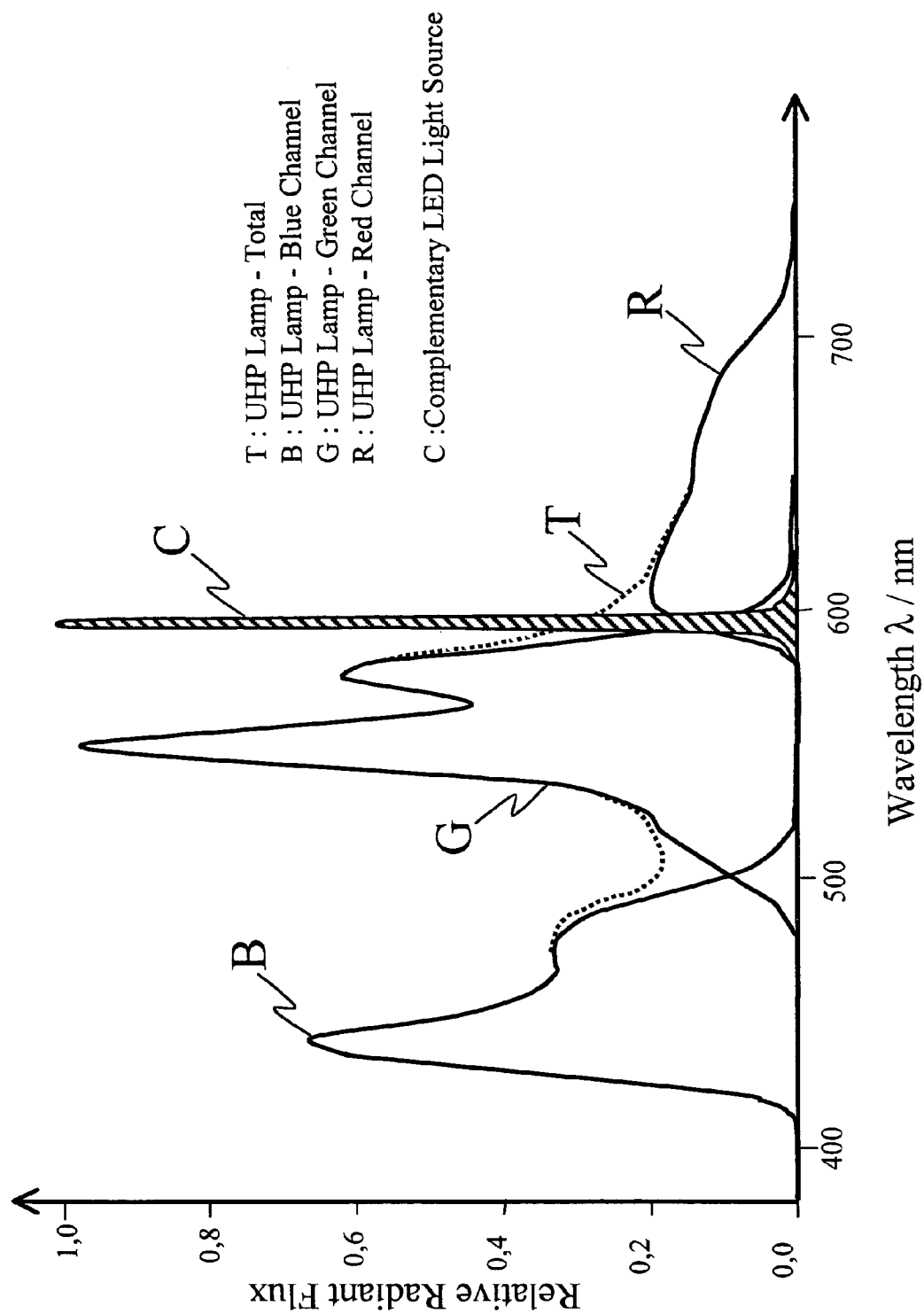
Figure 7:
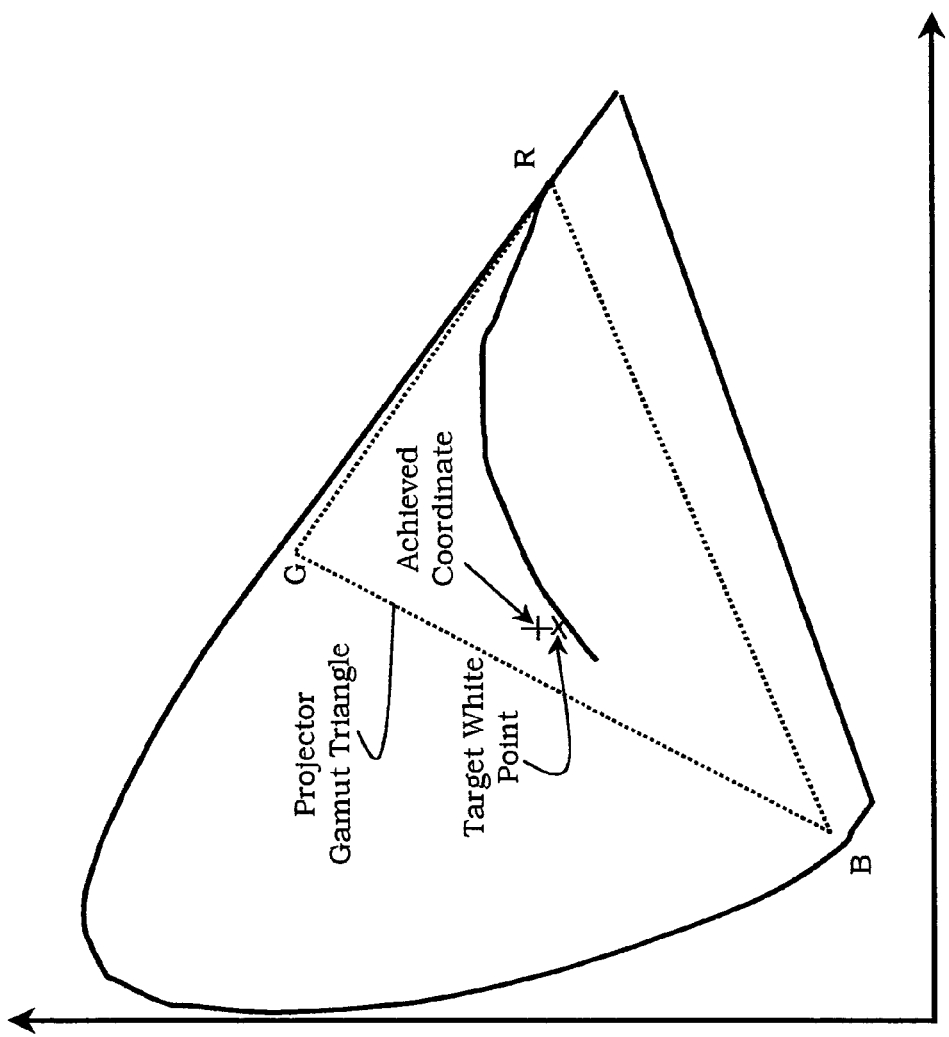

FIGS. 6, 7 elucidate schematically several spectral properties and features realized by the present invention.

In the following, elements and components having the similar or equivalent functions and structures will be described by taking reference to the identical reference symbols. A detailed description is not repeated in each case for these elements and components.

Figure 1:
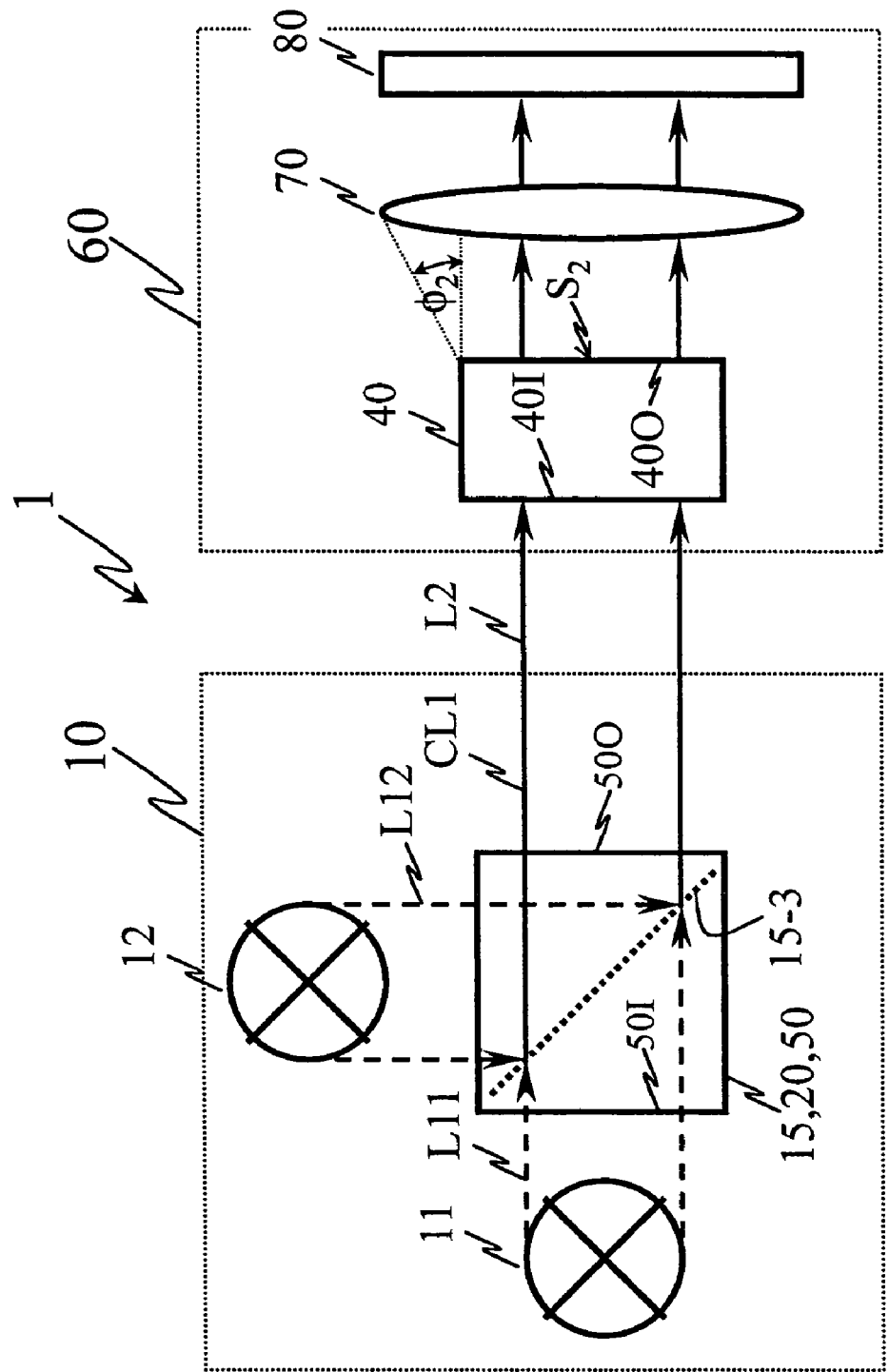
FIG. 1 is a schematical block diagram illustrating the working principle of the invention.

FIG. 1 is a schematical block diagram which elucidates the inventive projection engine 1 comprising the inventive illumination unit 10. In the embodiment according to FIG. 1 the illumination unit 10 comprises a first light source device 11 and a second light source device 12. The first light source device 11 is adapted to generate, provide and emit first primary illumination light L11. Said second light source device 12 is adapted for generating, providing and emitting second primary illumination light L12. Said first and second primary illumination light L11 and L12 are irradiated to a light combining area 15, section 15, portion 15, or device 15, which is in the case of the embodiment of FIG. 1 for instance a dichroic band-pass filter 15-3 and in spatial relationship combined with light collecting, integrating and redirecting area 20, section 20, portion 20, or unit 20, and in particular with a light integrating area 50, section 50, portion 50, or device 50 thereof. In said light combining device 15 said first and second primary illumination light L11, L12 are combined and/or superposed and leave said light combining device 15 as a superposition or combination, i.e. as combined primary illumination light CL1.

Through the action of the light collecting, integrating and redirecting unit 20 or its light integrating device 50 said combined primary illumination light CL1 is made uniform with respect to its spatial energy distribution or intensity and leaves the light collecting, integrating and redirecting area 20, section 20, portion 20, or unit 20 or its light integrating device 50 as secondary illumination light L2 via the light output surface 50O.

Said secondary illumination light L2 then enters a light valve device 40 via its light input surface 40I having a illumination area $S_2$ and leaves said light valve device 40 via its light output surface 40O having a illumination area $S_2$ so as to enter display optics 60 constituted by projection optics 70 and a display screen 80, wherein said light valve device 40 is adapted for controllably generating an image to be displayed on the display screen 80 by accordingly and appropriately interacting with the secondary illumination light L2.

Figure 2:
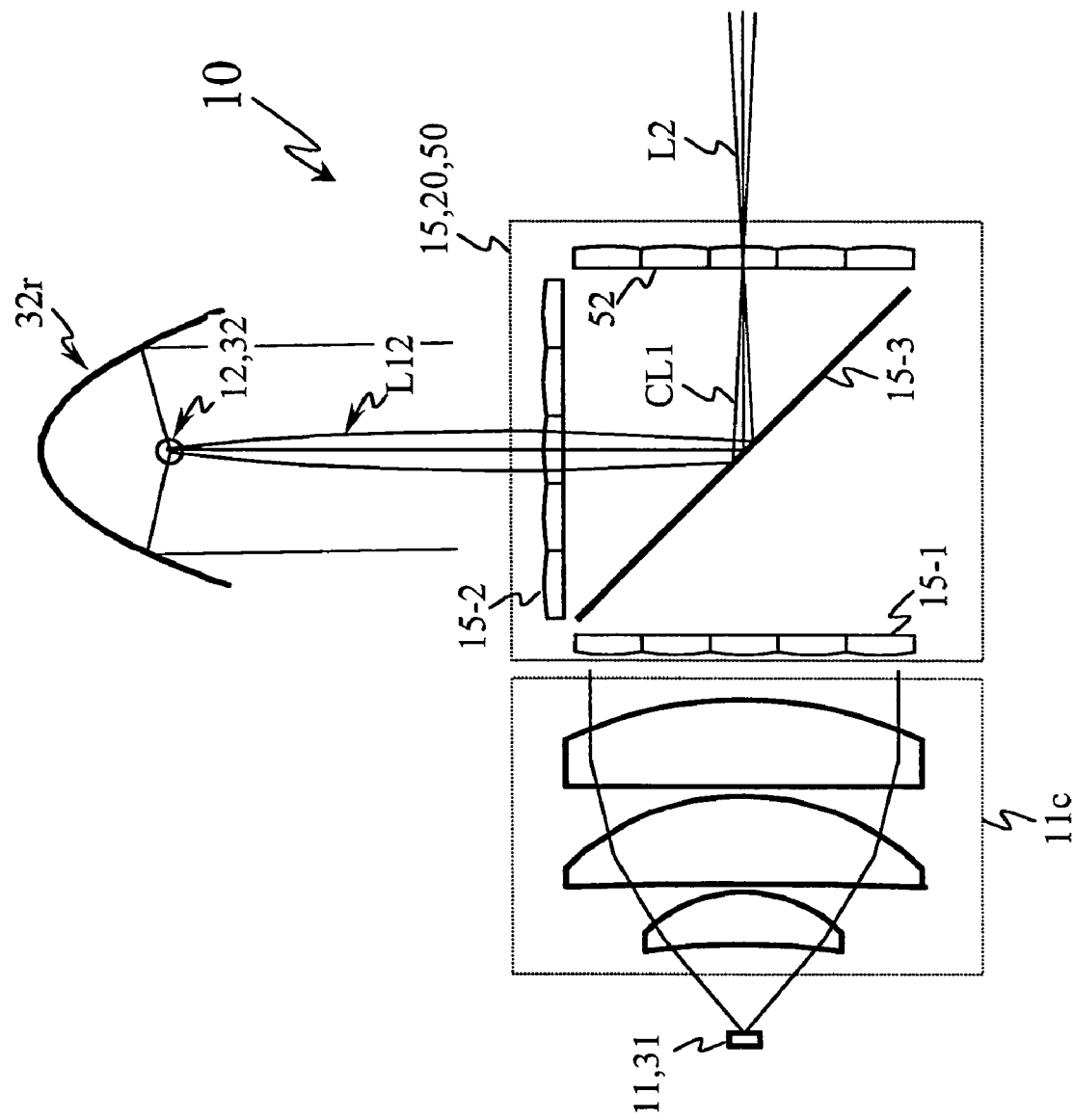
FIGS. 2–5 are schematical and cross-sectional side views of further preferred embodiments of the inventive illumination unit and the inventive projection system.

FIG. 2 is a schematical cross-sectional side view of a further preferred embodiment of the inventive illumination unit 10. In the embodiment of FIG. 2 said first light source device 11 is a light emitting diode or LED 31 followed by a condenser device 11c. The second light source device 12 is a ultra-high pressure discharge lamp or UHP lamp 32, the light of which being collected and redirected using a parabolic reflector 32r. The light combining device 15 of the embodiment of FIG. 2 comprises first fly-eye lenses 15-1 and 15-2 which are assigned to the light emitting diode 31 and the UHP lamp 32. Additionally a dichroic band-pass filter 15-3 is provided.

Said first and second primary illumination light L11 and L12 pass after completing interaction with the condenser device 11c or the parabolic reflector 12r, respectively, a respective assigned first fly-eye lens 15-1 and 15-2, respectively, and are then combined due to the action of the dichroic band-pass filter 15-3. Thereby, combined primary illumination light CL1 is generated and irradiated from the light combining device 15. By leaving said light combining device 15 said combined primary illumination light CL1 enters the light collecting, integrating and redirecting unit 20 having a light integrating device 50 in the form of a second fly-eye lens system 52. According to the action of the second fly-eye lens 52 said combined primary illumination light CL1 is made uniform with respect to its spatial energy distribution and transformed into secondary illumination light L2 which leaves the light collecting, integrating and redirecting unit and which can then be used for illumination and projection purposes.

Figure 3:
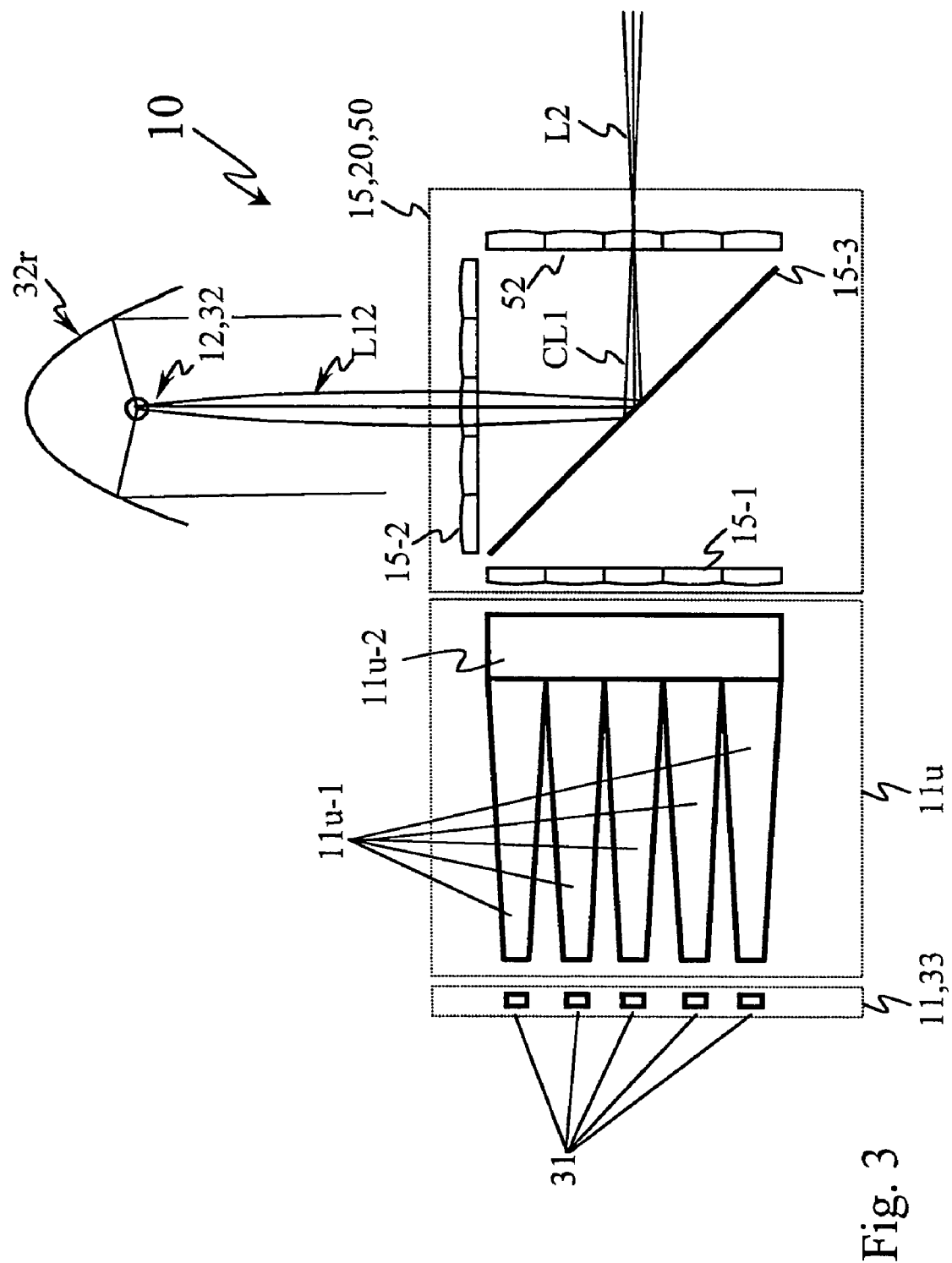

The embodiment of FIG. 3 is comparable to the embodiment of FIG. 2, except in that said first light source device 11 comprises an array 33 of a plurality of solid state light sources 31 in the form of light emitting diodes 31. Accordingly, the first light source device 11 is followed by a collimator and uniformer device 11u which is build up by an arrangement or array of first integrator rods 11u-1 followed by a single second integrator rod 11u-2. Each of the first integrator rods 11u-1 is uniquely assigned to one of the light emitting diodes 31 of the array 33.

The remaining components of the embodiment of FIG. 3 are equal or comparable to those of the embodiment of FIG. 2. Again, a second fly-eye lens 52 is used as a light integrating device 50 of the light collecting, integrating and redirecting unit 20.

Figure 5:
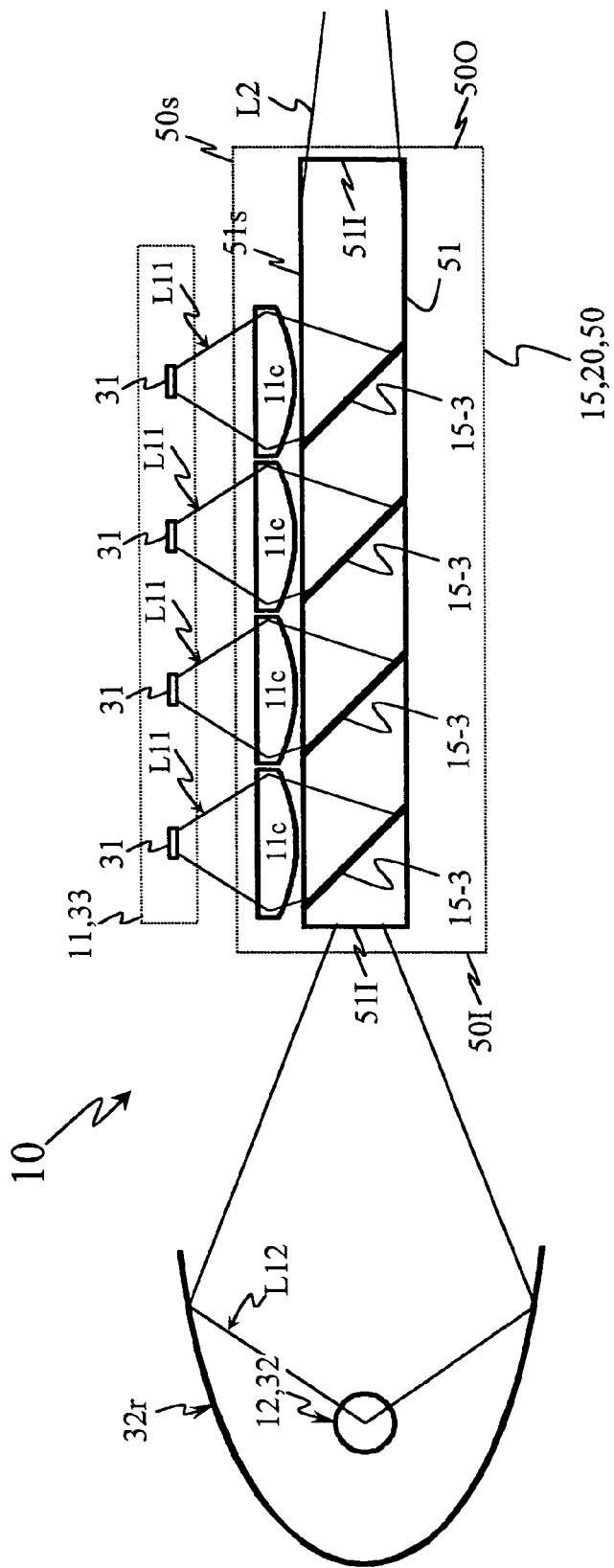

In contrast to the examples of FIGS. 2 and 3, where fly-eye lenses 52 are used as light integrating devices 50 for said light collecting, integrating and redirecting unit 20, the embodiment shown in FIG. 5 is mainly based on so-called integrator rods 51 or light pipes 51 as light integrating devices 50 for said light collecting, integrating and redirecting unit 20.

Figure 4:
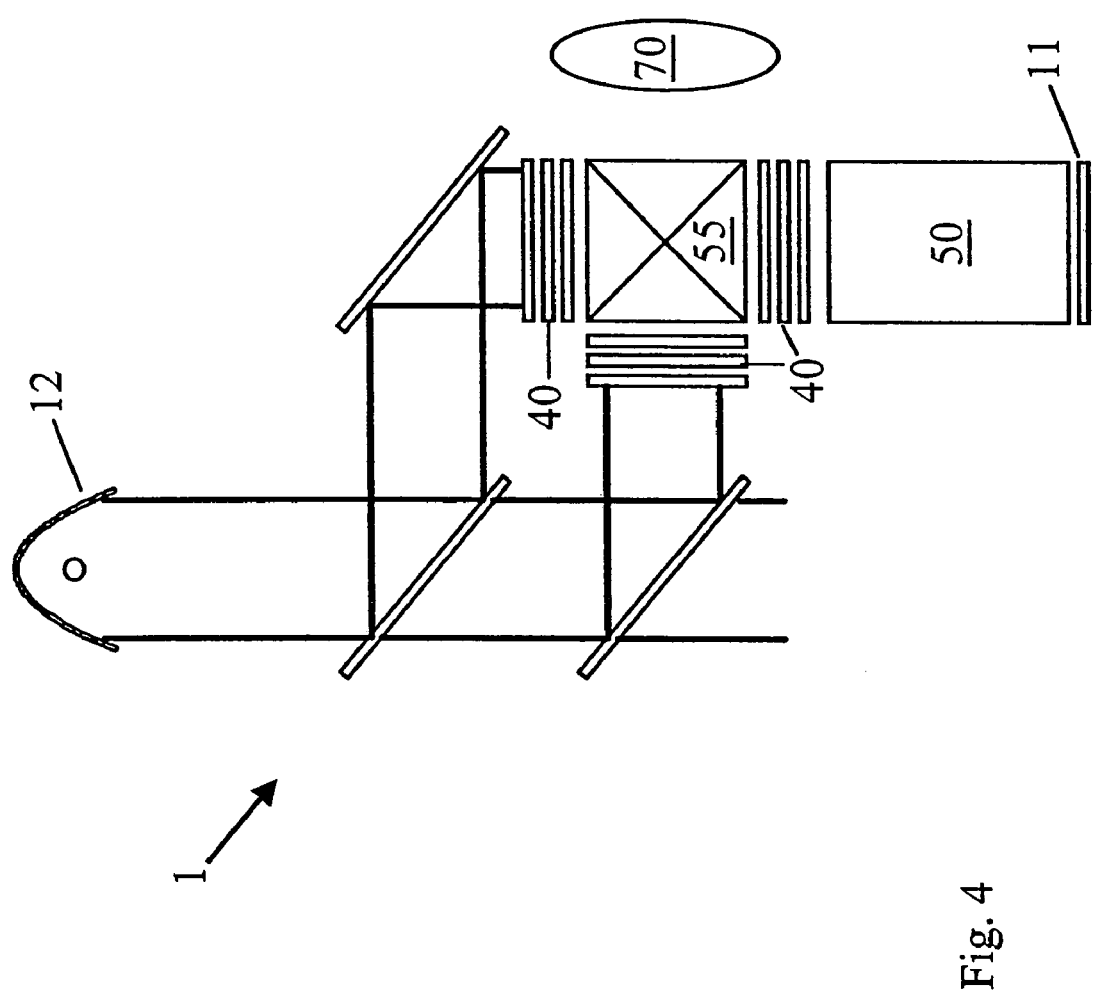

FIG. 4 demonstrates a hybrid situation for an inventive illumination unit 10 where for two different spectral ranges a high pressure lamp 12 is used as a part of said light source device. Additionally, a solid state light source device 11 is employed in the embodiment of FIG. 4 to supply primary and therefore secondary illumination light L1 and L2, respectively, of a color or spectral range sufficiently contained in the light of the high pressure lamp 12 to improve the color properties of the mixed light being emitted by the light mixing device 55 after the mixing process during which also the uniformization takes place.

The uniformization may take place before the mixing device and may be done by using either fly-eye lenses or integration rods.

The embodiment of FIG. 5 is adapted to combine types of first primary illumination light L1 from different light emitting diodes 31 or laser diodes forming an array 33 and the first light source device 11 and having e.g. different spectral or color properties with primary illumination light L12 of a UHP lamp 32 to form combined primary illumination light CL1 as well as secondary illumination light L2.

In the embodiment of FIG. 5 second primary illumination light L12 from the UHP lamp 32 forming a second light source device 12 enters the integration rod 51 forming the light integrating device 50 of the light collecting, integrating and redirecting unit 20 directly through the front face of the light entrance section 50I, 51I or the main light entrance area 50I, 51I.

In contrast, first primary illumination light L11 from the different light emitting diodes 31 enters the integration rod or integrator rod 51 through its side walls or side faces 50s, 51s.

Additionally said integrator rod 51 comprises within its structure a plurality of the above-mentioned light combining devices 15 in the form of dichroic band-pass filters 15-3. Therefore, said combined primary illumination light CL1 is formed simultaneously with an process of integrating and uniformizing the different kinds of primary illumination light L11 and L12 with the structure of the light collecting, integrating and redirecting unit 20.

LIST OF REFERENCE SYMBOLS

1 projection engine according to the present invention
10 illumination unit according to the present invention
11 first light source device
11c collimator, condenser device
11u uniformizer
11u-1 first uniformizing integrator rod, first uniformizing light pipe
11u-2 second uniformizing integrator rod, second uniformizing light pipe
12 second light source device
15 light combining area, portion or device
15-1 first fly-eye lens system
15-2 first fly-eye lens system
15-3 dichroic band-pass filter
20 light collecting, integrating and redirecting area, portion or unit
31 solid state light source, LED
32 discharge lamp, UHP lamp, HID lamp
32r reflector
33 array of solid state light sources
40 light valve device or unit 40I light input section, light entrance
40O light output section, light exit
50 light integrating device
50I light input section, light entrance
50O light output section, light exit
50s inner walls, side walls
51 integrator or integration rod, solid rod, light pipe
51I light input section, light entrance
51O light output section, light exit
51s inner walls, side walls
52 fly-eye lens system
60 display optics
70 projection optics
80 display screen
L11 first primary illumination light
L12 second primary illumination light
L2 secondary illumination light
CL1 combined primary illumination light
$S_2$ illuminated or irradiating surface
L lamp arrangement

The invention claimed is:

1. An illumination for a projection engine comprising:
at least a first light source device and a second light source device being adapted for generating and for emitting first and second primary illumination light, respectively, said first and second primary illumination light having at least in part essentially complementary spectra with respect to each other:
a light combining area, section, portion, or device being adapted for receiving and combining or superposing said first and second primary illumination light or parts or derivates thereof; and
a light collecting, intergrating redirecting area, section, portion, or unit being adapted for receiving, collecting, integrating, and redirecting said first and second primary illumination light or parts or derivates thereof,
wherein said light combining area, section, portion, or device and said light collecting, integrating, and redirecting area, section, portion, or unit or parts thereof are formed and/or arranged in a spatially mingled, mixed up, integrated, and/or overlapping manner with respect to each other,
thereby being adapted for cooperating and for obtaining from said first and second primary illumination light and for emitting collected, integrated, and redirected combined primary illumination light as secondary illumination light having controlled spectral properties and an essentially uniformized spatial intensity distribution.

2. The illumination unit according to claim 1,
wherein said light collecting, integrating, and redirecting area, section, portion, or unit comprises at least one of integrator rod, solid rod, hollow rod, or light pipe as a light integrating device made of an optically transparent material.

3. The illumination according to claim 1,
wherein said light collecting, integrating, and redirecting area, section, portion, or unit comprises at least one hollow tube device as a light integrating device having reflecting or mirrored inner walls or side walls.

4. The illumination unit according to claim 1,
wherein said light collecting, integrating, and redirecting area, section, portion, or unit comprises at least one fly-eye lens system as a light-integrating device.

5. The illumination unit according to claim 2,
wherein said light integrating device has a substantially square-shaped, substantially rectangular, substantially hexagonal, or substantially equilateral triangular cross-section.

6. The illumination unit according to claim 1,
wherein said first light source device and/or said second light source device includes a single or a plurality of discharge lamps.

7. The illumination unit according to claim 1,
wherein said first light source device and/or said second light source device includes a single or a plurality of solid state light source device.

8. The illumination unit according claim 7,
wherein said solid state light source device includes a single or a plurality of solid state light sources.

9. The illumination unit according to claim 8,
wherein said sold state light source includes an array of solid state light sources.

10. The illumination unit according to claim 7,
wherein said solid state light source includes a single or a plurality of light emitting diodes, and/or
wherein said solid state light source includes a single or a plurality of laser diodes.

11. The illumination unit according to claim 7,
wherein said solid state light source includes a single or a plurality of edge-emitting light emitting diodes.

12. The illumination unit according to claim 7,
wherein said solid state light source includes a single or a plurality of vertical cavity surface emitting laser devices.

13. The illumination unit according to claim 7,
wherein said solid state light source or includes a single or a plurality of resonant cavity light emitting diodes.

14. The illumination unit according to claim 1,
wherein said light combining area, section, portion, or device comprises spectral selective reflection element, or an arrangement of a plurality of spectral selective reflection elements.

15. The illumination unit according to claim 14,
wherein said spectral selective reflection element, or said arrangement of said plurality of spectral selective reflection elements is arranged within said integrator rod, solid rod, hollow rod, or light pipe as said light integrating device and/or
wherein said spectral selective reflection element, or said arrangement of said plurality of spectral selective reflection elements is arranged within and/or surrounded by said fly-eye lens system.

16. A projection engine with an illumination unit, the illumination unit comprising:
at least a first light source device and a second light source device being adapted for generating and for emitting first and second primary illumination light, respectively, said first and second primary illumination light having at least in part essentially complementary spectra with respect to each other;
a light combining area, section, portion, or device being adapted for receiving and combining or superposing said first and second primary illumination light or parts or derivates thereof; and
a light collecting, integrating, and redirecting area, section, portion, or unit being adapted for receiving, collecting, integrating, and redirecting said first and second primary illumination light or parts or derivates thereof, wherein said light combining area, section, portion, or device and said light collecting, integrating, and redirecting area, section, portion, or unit or a parts thereof are formed and/or arranged in a spatially mingled, mixed up, integrated, and/or overlapping manner with respect to each other, thereby being adapted for cooperating and for obtaining from said first and second primary illumination light and for emitting collected, integrated, and redirected combined primary illumination light as secondary illumination light having controlled spectral properties and an essentially uniformized spatial intensity distribution.

17. A method for generating and providing illumination light in a projection engine, comprising:

generating first and second primary illumination light having at least in part essentially complementary spectra; with respect to each other;

combining said first and second primary illumination lights or parts or derivates thereof; and collecting, integrating, and redirecting said first and second primary illumination lights or parts or derivates thereof, wherein the processes of combining said first and second primary illumination lights or parts or derivates thereof and of collecting, integrating, and redirecting said first and second primary illumination lights or parts or derivates thereof are performed in a spatially and/or temporally mingled, mixed up, integrated, and/or overlapping manner with respect to each other, thereby obtaining and outputting collected, integrated, and redirected combined primary illumination light as secondary illumination light having controlled spectral properties and an essentially uniformized intensity distribution.

* * * * *